(12) United States Patent
Zhuravlev et al.

(10) Patent No.: US 8,767,507 B2
(45) Date of Patent: Jul. 1, 2014

(54) METHOD FOR DETERMINATION OF THE OIL FORMATION'S WATER-FLOODING AREA RADIUS IN THE WELLBORE ZONE

(75) Inventors: Oleg Nikolaevich Zhuravlev, Moscow region (RU); Dmitry Anatolievich Koroteev, Moscow (RU); Irina Anatolievna Gorban, Moscow region (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 566 days.

(21) Appl. No.: 12/648,918

(22) Filed: Dec. 29, 2009

(65) Prior Publication Data

US 2010/0165790 A1 Jul. 1, 2010

(30) Foreign Application Priority Data

Dec. 30, 2008 (RU) .................. 2008152255

(51) Int. Cl.
*G01V 1/00* (2006.01)
(52) U.S. Cl.
USPC ................. 367/38; 405/129.4; 166/250.1
(58) Field of Classification Search
USPC .............. 166/250.1; 405/129.4; 367/38
See application file for complete search history.

(56) References Cited

U.S. PATENT DOCUMENTS

| 4,896,116 | A | 1/1990 | Nagashima et al. |
| 6,061,634 | A | 5/2000 | Belani et al. |
| 6,182,013 | B1 | 1/2001 | Malinverno et al. |
| 6,227,045 | B1 | 5/2001 | Morse et al. |
| 6,443,227 | B1 * | 9/2002 | Hocking et al. ........... 166/250.1 |
| 6,603,314 | B1 * | 8/2003 | Kostelnicek et al. ......... 324/368 |
| 6,739,165 | B1 * | 5/2004 | Strack ............................. 702/13 |
| 6,778,918 | B2 | 8/2004 | Delhomme et al. |
| 6,899,175 | B2 | 5/2005 | Kostrov et al. |
| 6,991,045 | B2 | 1/2006 | Vinegar et al. |
| 7,180,287 | B2 | 2/2007 | Rottengatter et al. |
| 7,984,755 | B2 * | 7/2011 | Serebrianski et al. ....... 166/65.1 |
| 2002/0101359 | A1 | 8/2002 | Huckaba et al. |
| 2003/0220750 | A1 | 11/2003 | Delhomme et al. |
| 2005/0173111 | A1 | 8/2005 | Bostick, III |
| 2007/0005253 | A1 | 1/2007 | Fornel et al. |
| 2007/0283761 | A1 | 12/2007 | Bostick, III |
| 2010/0165789 | A1 | 7/2010 | Zhuravlev et al. |

FOREIGN PATENT DOCUMENTS

| RU | 2315863 | 1/2008 |
| RU | 2349736 | 3/2009 |
| WO | 2008140655 | 11/2008 |

* cited by examiner

*Primary Examiner* — Mark Hellner

(57) ABSTRACT

A method includes installing at least one grounded electrode at a certain distance away from the well sufficient enough to avoid electrical breakdowns and connecting a high-voltage electric capacity meter to a wellhead and to said grounded electrode. A voltage pulse between the wellhead and the electrode. An electric capacity is measured before flooding and in the process of flooding. The oil formation water-flooding area radius value is determined by the flooded area capacity variation in time.

3 Claims, 1 Drawing Sheet

METHOD FOR DETERMINATION OF THE OIL FORMATION'S WATER-FLOODING AREA RADIUS IN THE WELLBORE ZONE

FIELD OF INVENTION

This invention relates to the oil well surveys, namely, to electrical measurements, which are performed with the aim to determine a radius of the oil formation's water-flooding area in the wellbore zone.

BACKGROUND OF THE INVENTION

In recent years, an idea of the on-line observation of the flood front has become more acute due to the depletion of oil fields and the application of residual oil displacement technologies, assuming water injection into injection wells. A great number of methods for the determination of the oil formation's water-flooding area radius in the wellbore zone are available, e.g., ref. to Patents: U.S. Pat. No. 6,061,634, 2000, U.S. Pat. No. 6,182,013, 2001.

A method for the determination of the oil formation's water-flooding area radius in the wellbore zone, which includes the connection of an electrical pulse generator to the wellhead and to the electrode, described in the Patent [U.S. 2003/0220750 A1, Publ. Nov. 27, 2003], is the closest analogue of the present invention (prototype). The authors suggest defining characteristic parameters of wellbore non-uniformities based on the results of combined acoustic and electrical measurements in the wellbore. The disadvantage of the above-mentioned method is that it can hardly be implemented in case if non-uniformities exceed 1 m. Besides, the implementation of this method based on the selected prototype is a labor-intensive and energy-consuming process due to a complex design of the system, which is used for the implementation of this method.

SUMMARY OF THE INVENTION

A task to be resolved by using present invention is to develop a simple, quick and effective method for determination of the oil formation's water-flooding area radius in the wellbore zone.

Technical result to be reached through the implementation of the claimed technical solution is the development of a method which is technically simple for implementation and can be applied under different field conditions and allows accurate measurements even at a small size of the oil formation's flooding area in the wellbore zone.

The assigned technical result is reached by using the following features: connection of an electrical pulse generator to the wellhead and to one electrode at least, wherein a high-voltage electric capacity meter is used as the electrical pulse generator; a grounded electrode installation at a certain distance away from the well, which should be sufficient enough to avoid electrical breakdowns; application of a pulse voltage between the wellhead and the electrode; electric capacity measurement in the water-flooding process; and on-line determination of the oil formation water-flooding area radius values based on the flooded area capacity change vs. time.

In addition, an alternating voltage pulse is applied as a pulse voltage.

In addition, in case if at least two electrodes are used, the oil formation water-flooding area radius is measured in at least two directions and a pattern of the oil formation's water-flooding area in the wellbore zone is determined.

BRIEF DESCRIPTION OF THE DRAWINGS

The invention is explained by the drawings, where.

DETAILED DESCRIPTION OF THE PREFERRED EMBODIMENTS

Figure 1:
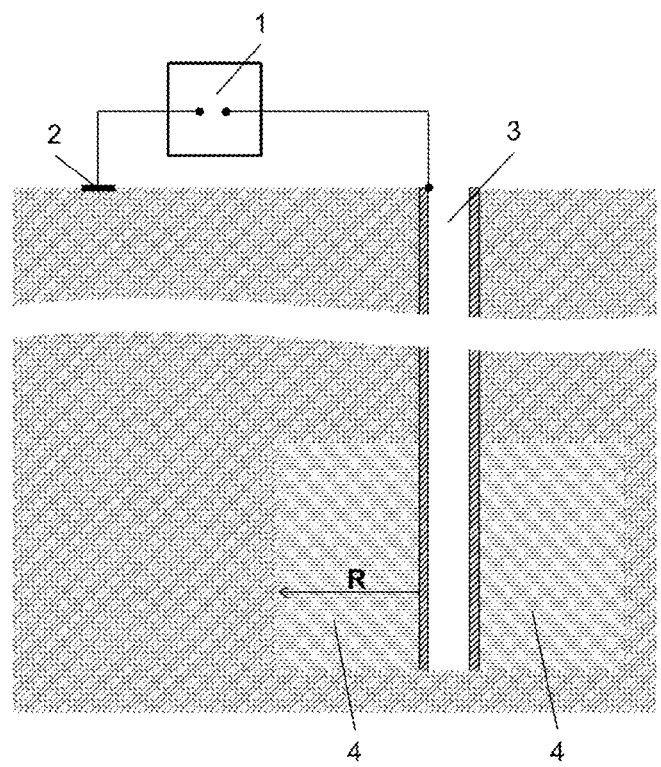
FIG. 1 is a schematic diagram showing an oil well with one grounded electrode arrangement according to the invention, FIG. 2—a schematic diagram showing a top view of an oil well with 4 grounded electrode arrangement according to the invention.

One of the embodiments of the invention is schematically shown in FIG. 1. A high-voltage electric capacity meter (1) is connected between a grounded electrode (2) and a wellhead of an oil well (3). Electrode (2) shall be grounded at a certain distance away from the well, which should be sufficient enough to avoid electrical breakdowns. The HV electric capacity meter can be connected to the wellhead by a direct lowering of the cable end into the well, or it can be connected to the tubing string in case if a cased well is used. Thereafter, an alternating voltage pulse is applied between the wellhead (3) and the electrode (2); electric capacity of the system before the beginning of the flooding process is measured (at a time when water fills in only the well). After that, a number of capacity measurements is performed during the flooding process and, based on a change in the flooded area capacity value vs. time, the oil formation's water-flooding area (4) radius is determined in real-time, using formula $$\Delta R \approx \frac{1}{8\varepsilon\varepsilon_0}\Delta C \qquad (1)$$

where $\varepsilon$—dielectric permittivity of unflooded rock, $\varepsilon_0$—dielectric permittivity of vacuum (electric constant) since the increase in the radius $\Delta R$ of the flooded area of the oil formation in the wellbore zone is caused by a change in the system capacity $\Delta C$.

The oil formation's water-flooding area radius is measured in at least two directions and a pattern of the oil formation water-flooding area in the wellbore zone is determined. As far as an oil formation's water-flooding area radius in the wellbore zone changes, electric capacity of the system also changes. This fact makes it possible to determine oil formation's water-flooding area radius in the wellbore zone, based on the capacity measurements.

Figure 2:
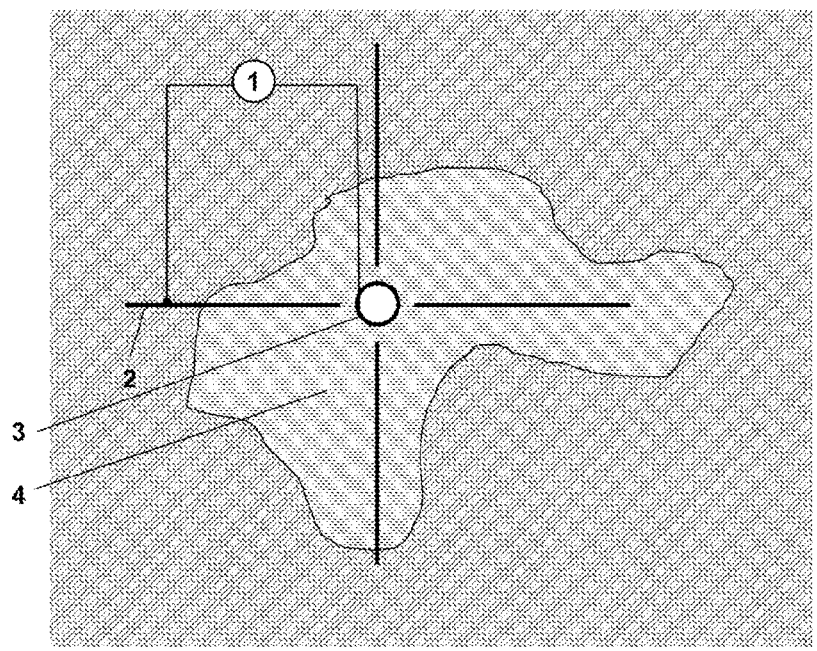

To assess front position, it is assumed that the flooded area of the oil formation in the wellbore zone (wellbore non-uniformity area) is a cylinder. In this case, the simplest measurement of the capacity allows us to assess a mean radius of this area. To obtain more detailed data on the flooded area of the oil formation in the wellbore zone, at least two electrodes are used; optimum solution is to use four electrodes in a way so that they would form a system of rays, diverged from the wellhead. FIG. 2 schematically illustrates the implementation of this case. In this case, a capacity measuring by HV electric capacity meter (1) between each grounded electrode (2) and a well (3) defines the position of the flood front in the direction of each electrode, which makes it possible to define a flood area pattern. In this particular case, several capacity meters connected between the wellhead and different electrodes can be used. This configuration allows determining of increased water-flooding area (4) in the direction of each electrodes, i.e. restoring the flooding area geometry.

The invention claimed is:

1. A method for determining a radius of a water flooding area in an oil-bearing formation, the method comprising:
  installing at least one grounded electrode at a certain distance away from a well, wherein the certain distance is sufficient enough to avoid electrical breakdowns;
  connecting a high-voltage electric capacity meter to a wellhead of the well and to said at least one grounded electrode, wherein said high-voltage electric capacity meter is used as a pulse generator;
  applying a voltage pulse between the wellhead and said at least one grounded electrode;
  injecting water into the well;
  measuring an electric capacity at a point when the well is filled with water and before the water moves into the formation;
  performing a number of capacity measurements during as the water moves into the formation and
  determining in real time the radius of the water flooding area of the formation by using a flooded area capacity variation in time.

2. A method of claim 1, wherein an alternating voltage pulse is applied as a voltage pulse.

3. A method of claim 1, the method further comprising using at least two grounded electrodes to measure the radius of the water flooding area in at least two directions and determining a pattern of the water flooding.

* * * * *